Figure 1:
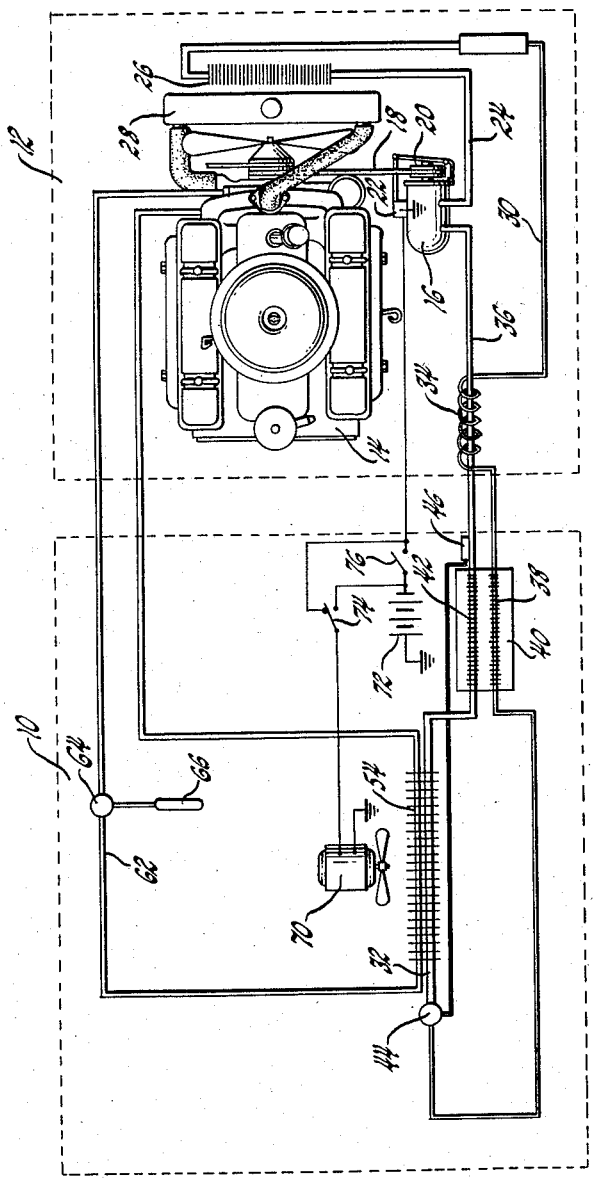

May 5, 1959 R. E. GOULD 2,884,768
AUTOMOBILE REFRIGERATING APPARATUS
Filed Feb. 23, 1955 2 Sheets-Sheet 1

INVENTOR.
Richard E. Gould
BY
R. R. Candor.
HIS ATTORNEY

United States Patent Office 2,884,768
Patented May 5, 1959

2,884,768
AUTOMOBILE REFRIGERATING APPARATUS

Richard E. Gould, Dayton, Ohio, assignor to General Motors Corporation, Detroit, Mich., a corporation of Delaware Application February 23, 1955, Serial No. 490,090

2 Claims. (Cl. 62—225)

This invention reelates to refrigerating apparatus and more particularly to an automobile air conditioning system.

It is an object of this invention to provide an improved low cost air conditioning system which may be used to either cool, heat or dehumidify air and one which operates efficiently at low car speeds.

Another object of this invention is to provide a system in which refrigeration capacity can be accumulated during periods of high speed compressor operation and later utilized during periods of low speed compressor operation such as occurs when driving through towns at a reduced speed. More particularly, it is an object of this invention to utilize excess refrigeration capacity for freezing or cooling water or some other suitable eutectic solution during high speed operation and to melt or heat the solution during low speed operation so as to increase the output of the system at the low speed.

Another object of this invention is to provide an improved arrangement for modulating the temperature in the passenger compartment of a car.

Further objects and advantages of the present invention will be apparent from the following description, reference being had to the accompanying drawings, wherein a preferred form of the present invention is clearly shown.

Figure 2:
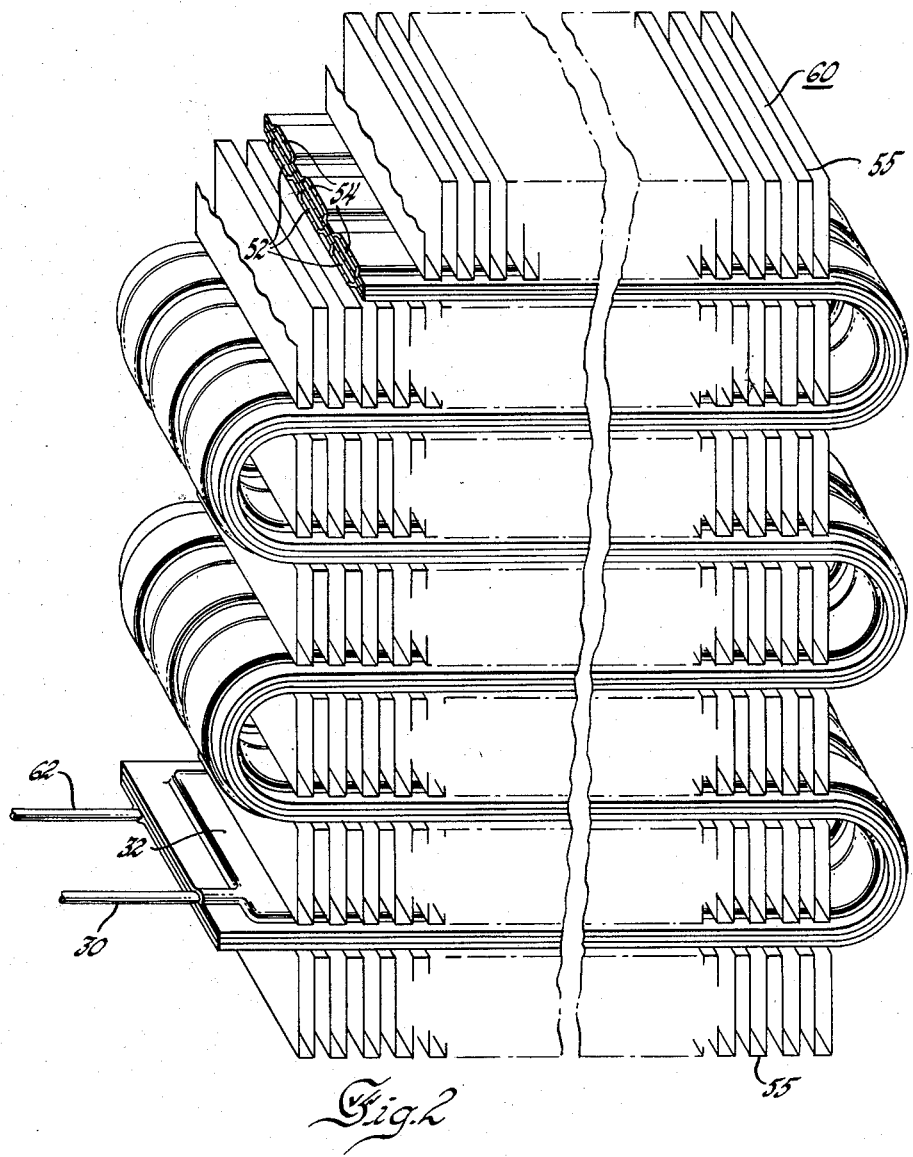

In the drawings:

Figure 1 is a plan view, largely schematic, showing the invention as applied to automobile air conditioners; and Figure 2 is a perspective view with parts broken away showing the construction of the air contacting coils.

Referring now to the drawing where a preferred form of the present invention is shown, reference numerals 10 and 12 generally designate the passenger compartment and the engine compartment respectively of a passenger automobile. A conventional internal combustion engine 14 is arranged in the engine compartment in accordance with standard practice and is used for not only operating the automobile, but also driving a refrigerant compressor 16 which is drivingly connected to the engine by means of a belt 18 and clutch 20. The clutch 20 is controlled by a solenoid 22 which in turn is controlled by the manual switch 76 located in the passenger compartment of the car.

The outlet of the compressor 16 discharges into a line 24 which leads to a condenser 26 mounted directly in front of main engine radiator 28 so as to be cooled by the air flowing through the engine compartment 12 in accordance with standard practice. The condensed refrigerant flows through a line 30 which leads to an evaporator having a first portion 32 for cooling air and a second portion 42 for cooling a hold-over medium in the tank 40. The line 30 includes a heat interchanger portion 34 which is arranged in thermal exchange relationship with the suction line 36 which connects the outlet of the evaporator to the inlet of the compressor 16. A portion 38 of the liquid line 30 passes through the tank 40 in which water or some other suitable eutectic solution is provided.

The arrangement of the second evaporator portion 42 is such that it, in effect, constitutes an extension of the evaporator 32. At high car speeds and at times when the evaporator has excess capacity the excess liquid refrigerant leaving the evaporator portion 32 serves to refrigerate the solution in the tank 40. The flow of liquid refrigerant into the evaporator portions 32 and 42 is controlled by means of a thermostatic expansion valve 44 which is arranged as shown and which includes a thermostatic bulb 46 located at the outlet of the portion 42. By virtue of the above described arrangement, it is obvious that the bulb 46 will not modulate the flow of refrigerant into the evaporator until the liquid refrigerant has completely filled the evaporator portions 32 and 42. By refrigerating the solution in the tank 40, it is possible to store a considerable amount of refrigeration when the system has excess capacity and to make use of the stored refrigerant at other times. The chilled or frozen liquid in the tank 40 is made available for increasing the capacity of the refrigerating system at low car speeds by virtue of the fact that the liquid refrigerant supply line portion 38 passes through the tank 40 whereby the liquid refrigerant flowing to the evaporator will be pre-chilled by the cold solution in the tank 40.

It is obvious that the speed of the car engine will vary widely without any regard to refrigeration requirements and this complicates the matter of controlling the temperature in the passenger compartment of the car as well as complicates the matter of having adequate refrigeration capacity at slow car speeds. Rather than attempting to modulate the flow of refrigerant through the evaporator so as to maintain the desired car temperatures the refrigerating system is operated at its maximum available capacity at all times and the modulating of the car temperature is accomplished by heating the air for the passenger compartment whenever there is excess refrigeration capacity. As diagrammatically shown in Figure 1, the heating means comprises a hot water type of heating system which uses waste engine heat for heating the air. Hot water from the car engine is supplied to one or more air heating passages 54 by means of the hot water supply line 62 in which a thermostatically operated valve 64 is located. The valve 64 includes a temperature responsive bulb 66 which serves to increase the flow of hot water to the passages whenever the temperature in the passenger compartment falls below a predetermined value.

The first evaporator portion 32 and the heater passages 54 are all formed as a part of an air contacting unit generally designated by the reference number 60 and shown in Figure 2 of the drawing. The air contacting unit 60 is formed by the roll bonding process more fully disclosed in co-pending application, Serial No. 356,376 filed May 21, 1953, now Patent No. 2,845,-695, and consists of an elongated roll bonded strip which is bent into a serpentine shape as best shown in Figure 2 and which includes a first set of refrigerant passages 52 which are formed between one of the outer sheets and the center sheet, and a second set of hot water passages 54 which are formed between the center sheet and the other outer sheet. The elongated strip of roll bonded material which is used in forming the air contacting coil is preferably bent into serpentine shape as shown in Figure 2 and then provided with corrugated fin strips 55 between the adjacent straight portions of the serpentine member. The arrangement of the passages in the heat exchanger shown in Figure 2 differs from the arrangement of passages shown in application Serial No. 356,376 in that the refrigerant passages herein are directly opposite the water passages. It will be observed that this construction makes it possible to so arrange the fins that every other one of the fin strips is arranged in direct contact with refrigerant passages and the other fin strips are arranged in direct contact with the hot water passages.

It is obvious that it is possible to compensate for excess refrigerant capacity at high car speeds by supplying hot water or the equivalent from the engine cooling system through the hot water passages of the air contacting coil. It is also obvious that certain of the fins will be refrigerated when the refrigerated system is in operation and that other fins will be heated when hot water is applied from the engine cooling system to the hot water passages of the air contacting coil. By virtue of the above described construction, the system will function so as to cause dehumidification of the air at such times when both refrigeration and hot liquid are supplied to the passages of the air contacting coil.

Suitable blower means 70 is provided for circulating air to be conditioned for the passenger compartment in thermal exchange relationship with the air contacting coil. The blower means 70 is adapted to be energized from the main car battery 72 by closing the switch 74 as shown in Figure 1. Since there are times of the year when no refrigeration is ever required, there is provided a manually operated switch 76 for controlling the clutch operating solenoid 22 so as to render the compressor and consequently the entire refrigeration system inoperative. The air contacting coil is then used solely for heating the air when heating is required.

The liquid used in the heating system would be of the type which would not solidify at the low temperatures produced by the refrigerant flowing through the evaporator passages of the air contacting coil. Any antifreeze solution such as that used extensively in car radiators during winter time operation could be used.

While the form of embodiment of the invention as herein disclosed constitutes a preferred form, it is to be understood that other forms might be adopted, as may come within the scope of the claims which follow.

What is claimed is as follows:

1. In an automobile having an engine compartment and a passenger compartment, an engine in said engine compartment for propelling the automobile, a refrigerant compressor, torque transmitting means drivingly connecting said compressor to said engine, a condenser, evaporator means, refrigerant flow means connecting said compressor, condenser and evaporator into refrigerant flow relationship, a refrigeration storage unit including a receptacle adapted to contain a eutectic solution, said evaporator means including a first evaporator portion for cooling air for said passenger compartment and a second evaporator portion for cooling said eutectic solution, said refrigerant flow means including a thermostatic expansion valve adjacent the inlet of said evaporator means and having a thermostatic bulb located adjacent the outlet of said second evaporator portion, said refrigerant flow means including a liquid refrigerant feed line for conveying liquid refrigerant flowing from said condenser to said evaporator means into thermal exchange relationship with said eutectic solution before entering said evaporator means.

2. In combination with an automobile having a main engine located in an engine compartment and having a passenger compartment separated from said engine compartment, air conditioning means for controlling the temperature in said passenger compartment, said air conditioning means comprising a compressor driven by said engine, a condenser, an evaporator means, means for connecting said evaporator means in refrigerant flow relationship with said compressor and said condenser, and means for storing excess refrigeration capacity at high engine speeds and for utilizing said stored capacity at low engine speeds comprising a refrigerant storage unit having a eutectic solution arranged in thermal exchange relationship with a portion of said evaporator means and with the liquid refrigerant flowing from said condenser to said evaporator means.

References Cited in the file of this patent

UNITED STATES PATENTS

| | | |
|---|---|---|
| 2,010,504 | Askin | Aug. 6, 1935 |
| 2,090,208 | Knudson | Aug. 17, 1937 |
| 2,180,760 | Mayo | Nov. 21, 1939 |
| 2,185,022 | Candor | Dec. 26, 1939 |
| 2,188,975 | Herz | Feb. 6, 1940 |
| 2,388,210 | Hanson et al. | Oct. 30, 1945 |
| 2,460,135 | Lehane et al. | Jan. 25, 1949 |
| 2,467,398 | Miller | Apr. 19, 1949 |
| 2,515,825 | Grant | July 18, 1950 |
| 2,645,101 | La Porte | July 14, 1953 |
| 2,687,021 | Mattison | Aug. 24, 1954 |
| 2,698,522 | La Porte | Jan. 4, 1955 |
| 2,720,087 | Groene | Oct. 11, 1955 |
| 2,735,657 | Owen | Feb. 21, 1956 |
| 2,770,104 | Sweynor | Nov. 12, 1956 |